June 30, 1970  R. C. SMITH  3,517,565
UNIVERSAL BELT DRIVE
Filed Jan. 2, 1968
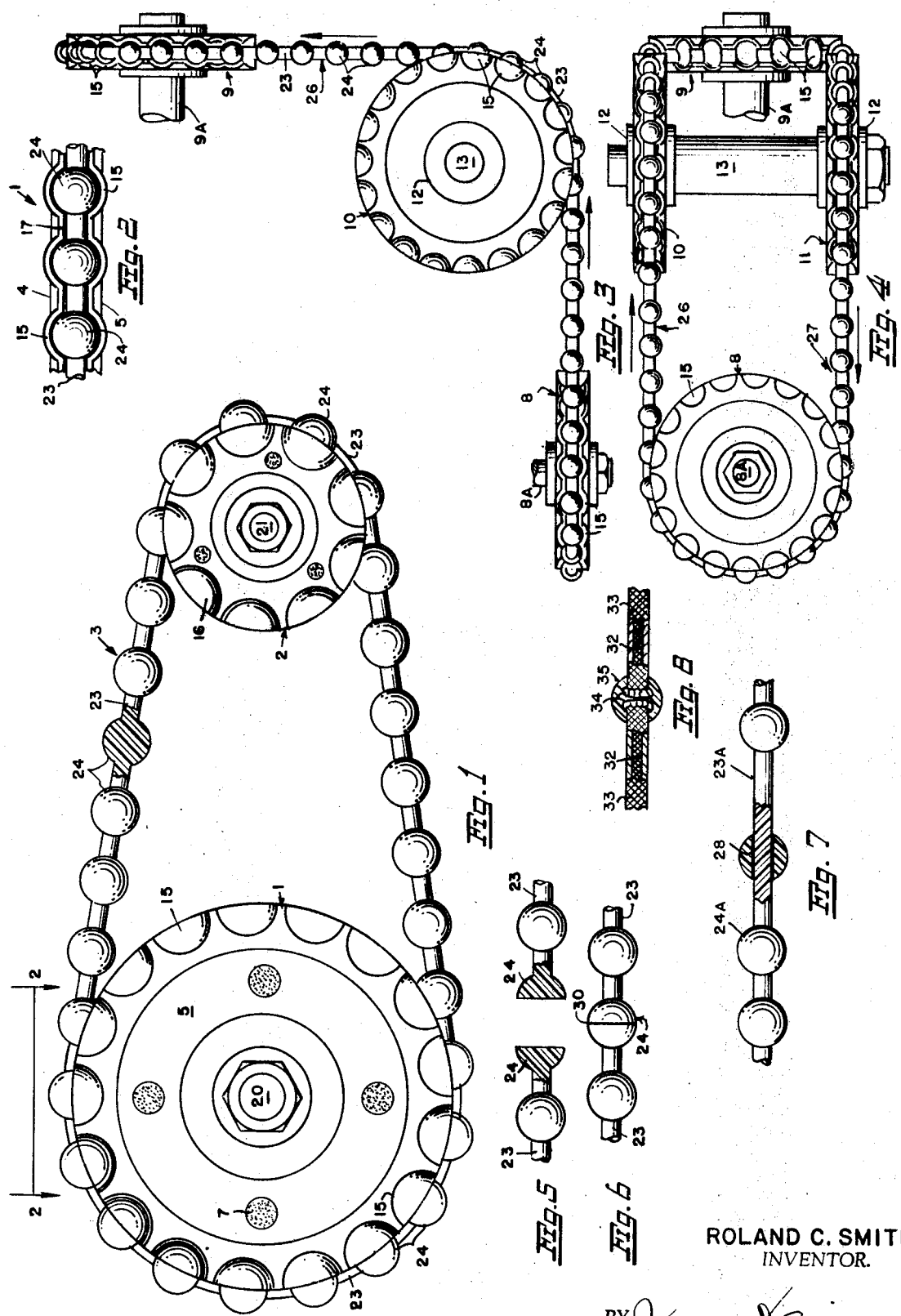
ROLAND C. SMITH
INVENTOR.
BY *James L. Girman*
ATT'Y

United States Patent Office 3,517,565
Patented June 30, 1970

3,517,565
UNIVERSAL BELT DRIVE
Roland C. Smith, 4433 Dover Ave. NE.,
Salem, Oreg. 97303
Filed Jan. 2, 1968, Ser. No. 694,905
Int. Cl. F16g 1/14, 1/28
U.S. Cl. 74—231                            1 Claim

ABSTRACT OF THE DISCLOSURE

A power transmitting mechanism including a driving wheel, a driven wheel, a driving connection therebetween and wherein the wheels are provided with sockets for driving engagement with ball members formed on a belt comprising the driving connection and wherein by reason of the ball and socket relationship the reaches of the belt are self-conforming to any changes in angularity without twisting the belt.

---

This invention relates to improvements in power transmitting mechanisms and more particularly to a driving wheel, a driven wheel and a driving connection therebetween, all of which are preferably, though not restrictively, made of molded plastic and therefore particularly well suited to low cost quantity production.

The objects of the invention are:

To provide driving and driven wheels distinguished from conventional gear trains, sprocket wheels and chains, pulleys and belts, by the provision of cup-shaped bearing surfaces or sockets for driving cooperation with a ball-belt without slippage occurring between the wheels and the belt.

To provide a wheel and belt drive which accommodates a greater degree of misalignment than heretofore possible by conventional pulleys and a belt drive.

To provide a drive connection of the character described which may be quickly and conveniently shortened or lengthened in accordance with the spacing requirements of the driving and driven wheels.

To provide the drive connection, and the wheel members if desired or necessary, with a coating of polyurethane to resist wear and thus prolong the life of all the components.

The foregoing and other objects and advantages which will become subsequently apparent reside in the details of construction and operation as more fully hereinafter described and claimed, reference being had to the accompanying drawing forming a part hereof and in which:

FIG. 1 is a side elevational view of a power transmission mechanism made in accordance with my invention.

FIG. 2 is a fragmentary detail view typical of the ball-belt engagement with either wheel and taken, for example, along the line 2—2 of FIG. 1.

FIG. 3 is a top plan view of a modified arrangement of the power transmission mechanism including angularly related driving and driven wheels operating in a vertical plane and idling wheels in a horizontal plane with the top and bottom runs of their belt conforming to the change in angularity without twisting.

FIG. 4 is a side elevational view of FIG. 3.

FIG. 5 illustrates the manner of changing the length of the belt drive by splitting spaced apart ball members to remove the section therebetween and adhesively reuniting the loose ends belt.

FIG. 6 shows the belt of FIG. 5 with its ends united.

FIG. 7 illustrates the manner in which the ball members may be molded independently of the belt and secured thereto at any desired spaced intervals.

FIG. 8 is a detail view on an enlarged scale of a further modification of the belt and ball members.

With continuing reference to the drawing wherein like reference numerals designate like parts and particularly FIG. 1 thereof, let it be assumed that the driving wheel is indicated generally at 1, the driven wheel at 2, and 3 the driving connection between the wheels.

Each wheel member, as exemplified fragmentarily in FIG. 2, comprises two molded plastic disks 4 and 5 fused together as at 7 or otherwise interconnected as a solid unit in any suitable manner. Both wheels 1 and 2 may be of unequal diameters as shown in FIG. 1 or of equal diameters as shown in FIGS. 3 and 4 wherein 8 indicates, for example, the driving wheel, 9 the driven wheel and 10 and 11 idling wheels therebetween rotatably mounted by suitable bearings 12 carried by the top and bottom ends of a vertical shaft 13. Wheels 8 and 9 are secured to and rotate with respective shafts 8A and 9A.

Each wheel whether of solid molded plastic or made of two molded plastic disks, as aforesaid, is provided with equally spaced sockets 15 as shown in wheel 1 and as at 16 in wheel 2 in open communication with interconnecting channels 17 (FIG. 2). The wheels 1 and 2 are secured to their respective shafts 20 and 21.

The drive connection between the wheels comprises a core 23 of Dacron molded integral with equally spaced apart Dacron ball members 24 whose spacing is equal to the circumferential spacing of the sockets 15–16 in the wheels 1 and 2.

From the foregoing it will be readily apparent that the action of any ball member of the belt in engagement with a socket of either wheel is the functional equivalent of any other well-known ball and socket arrangement. By the swivel action of such relationship the angular disposition of one wheel, for example wheel 8 in FIG. 3, can be in any angular relationship to wheel 9 and to the idling wheels 10 and 11.

To clarify this function and assuming that the top and bottom reaches 26 and 27 of the belt are travelling in the direction of the applied arrows it will be seen that the ball members 24 will ride steadily within the sockets 15 of all the wheels without twisting the belt 23 because of the ball and socket action of the ball members with the sockets.

In changing the length of the belt as shown in FIGS. 5 and 6, two ball members 24 may be split in half with the desired number of ball members therebetween removed then bringing the two halves together for securement into a unitary ball by an epoxy coating 30 whose thickness should equal that of the saw cut dividing the severed ball members.

As shown in FIGS. 1 and 5, the belt 23 and ball members 24 are of synthetic materials and mold-united.

In FIG. 7, the belt 23A and ball members 24A are of the same synthetic materials but instead of mold-united the ball members are molded separately and provided with an opening 28 therethrough for securement to the belt at any desired spaced intervals by a coating of epoxy or the like.

In the modification shown in FIG. 8, the belt comprises a core 32 made of braided nylon encased within braided Dacron 33. The braided core 32 and its Dacron casing 33 are cut to the desired length of a belt to be produced. The cutting operation will allow the cut ends of the braided nylon strands to expand and spread generally in a radial direction. When the severed ends of the nylon strands are in abutting contact or closely adjacent each other the plastic ball 35 is molded around those ends which, when subjected to the molding temperature of the ball, will become securely united with the ball as an integral juncture to thus provide a secure permanent connection of the two ends of the endless belt.

What I claim is:
1. In a flexible power transmission belt, the improvement comprising:
   a selected length of braided strands of nylon material within a casing of unlike material and a plurality of spaced apart ball members mold united with the belt,
   the free ends of said nylon strands extending beyond their respective ends of said casing and in abutting contact with each other,
   a plastic ball molded about said ends of the nylon strands which by subjection to the molding temperature of the ball enlarge into beaded ends for secure permanent integration within the ball member.

References Cited

UNITED STATES PATENTS

| 1,958,841 | 5/1934 | Bateholts. | |
| 2,856,752 | 10/1958 | Bahr | 74—243 XR |
| 3,091,030 | 5/1963 | Zumbrunnen | 74—231 XR |
| 3,237,470 | 3/1966 | Birk | 74—229 |

FOREIGN PATENTS

| 4,337 | 1896 | Great Britain. |
| 127,161 | 5/1919 | Great Britain. |

JAMES A. WONG, Primary Examiner